(12) United States Patent
Park et al.

(10) Patent No.: US 7,734,468 B2
(45) Date of Patent: Jun. 8, 2010

(54) METHOD OF AND APPARATUS FOR MANAGING DIALOG BETWEEN USER AND AGENT

(75) Inventors: Joon-ah Park, Seoul (KR); Young-jin Hong, Gyeonggi-do (KR); Jae-won Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1170 days.

(21) Appl. No.: 10/732,235

(22) Filed: Dec. 11, 2003

(65) Prior Publication Data

US 2004/0122673 A1 Jun. 24, 2004

(30) Foreign Application Priority Data

Dec. 11, 2002 (KR) .................. 10-2002-0078721

(51) Int. Cl.
*G10L 21/00* (2006.01)
*G06K 9/00* (2006.01)

(52) U.S. Cl. .............. 704/270; 704/251; 704/275; 382/118

(58) Field of Classification Search ............ 704/251, 704/257, 270, 275; 382/116–118; 379/88.01
See application file for complete search history.

(56) References Cited

U.S. PATENT DOCUMENTS

| | | | | |
|---|---|---|---|---|
| 5,357,596 A | * | 10/1994 | Takebayashi et al. | 704/275 |
| 5,809,447 A | * | 9/1998 | Kato et al. | 701/211 |
| 5,865,626 A | * | 2/1999 | Beattie et al. | 704/240 |
| 6,098,043 A | | 8/2000 | Forest et al. | |
| 6,199,043 B1 | * | 3/2001 | Happ | 704/272 |
| 6,219,640 B1 | * | 4/2001 | Basu et al. | 704/246 |
| 6,246,986 B1 | * | 6/2001 | Ammicht et al. | 704/270 |
| 6,513,011 B1 | * | 1/2003 | Uwakubo | 704/275 |
| 6,570,555 B1 | * | 5/2003 | Prevost et al. | 345/156 |
| 6,629,242 B2 | * | 9/2003 | Kamiya et al. | 713/100 |
| 6,721,706 B1 | * | 4/2004 | Strubbe et al. | 704/275 |
| 6,724,864 B1 | * | 4/2004 | Denenberg et al. | 704/E13.008 |

(Continued)

FOREIGN PATENT DOCUMENTS

EP 0 543 329 A2 5/1993

(Continued)

OTHER PUBLICATIONS

Cassell, "Embodied Conversational Interface Agents", in: Communications of the ACM, vol. 43, No. 4, Apr. 2000, pp. 70-78.*

(Continued)

*Primary Examiner*—James S Wozniak
(74) *Attorney, Agent, or Firm*—Staas & Halsey LLP

(57) ABSTRACT

A method of rapidly and precisely managing a dialog turn between a user and an agent by using speech information, facial expression information, and delay time information includes generating first dialog turn information using dialog information analyzed from a speech uttered by the user, generating second dialog turn information using facial expression information analyzed from a face image of the user, and determining a final dialog turn using the first and second dialog turn information, information on a status of the spoken dialog system, information on whether the user speech is input, and information on a no-answer time of the user.

36 Claims, 6 Drawing Sheets

U.S. PATENT DOCUMENTS

| | | | |
|---|---|---|---|
| 6,785,651 B1 * | 8/2004 | Wang | 704/246 |
| 6,941,268 B2 * | 9/2005 | Porter et al. | 704/270 |
| 6,964,023 B2 * | 11/2005 | Maes et al. | 715/811 |
| 6,999,931 B2 * | 2/2006 | Zhou | 704/275 |
| 7,019,749 B2 * | 3/2006 | Guo et al. | 704/231 |
| 7,020,607 B2 * | 3/2006 | Adachi | 704/257 |
| 2002/0135618 A1 | 9/2002 | Maes et al. | |
| 2002/0147581 A1 * | 10/2002 | Shriberg et al. | 704/207 |
| 2002/0178344 A1 * | 11/2002 | Bourguet et al. | 712/1 |
| 2003/0046087 A1 * | 3/2003 | Johnston et al. | 704/275 |

FOREIGN PATENT DOCUMENTS

| | | |
|---|---|---|
| JP | 09-269889 | 10/1997 |
| JP | 2000-276326 | 10/2000 |
| JP | 2002- 196789 | 7/2002 |
| JP | 2002-244841 | 8/2002 |

OTHER PUBLICATIONS

Breazeal, "Proto-conversations with an Anthropomorphic Robot. In Proceedings of the 2000 IEEE International Workshop on Robot and Human InbteractiveCommunication," Osaka, Japan, Sep. 2000, pp. 328-333.*

Huang et al, "Dialogue Management for Multimodal User Registration," in Proceedings International Conference on Spoken Language Processing, Beijing, China, Oct. 2000.*

Marc Swerts, et al.; *Prosodic and Lexical Indications of Discourse Structure in Human—Machine Interactions*; Speech Communication; 1997; pp. 25-35.

Korean Office Action.

* cited by examiner

METHOD OF AND APPARATUS FOR MANAGING DIALOG BETWEEN USER AND AGENT

CROSS-REFERENCE TO RELATED APPLICATION

This application claims the benefit of Korean Patent Application No. 2002-78721, filed on Dec. 11, 2002 in the Korean Intellectual Property Office, the disclosure of which is incorporated herein in its entirety by reference.

BACKGROUND OF THE INVENTION

1. Field of the Invention

The present invention relates to a spoken dialog system, and more particularly, to a method of and apparatus for rapidly and precisely managing a dialog turn between a user and an agent by using speech information, facial expression information, and delay time information, and a spoken dialog system using the method and apparatus.

2. Description of the Related Art

Agents are classified as software agents and hardware agents. The software agents generally work as an interface on a screen of a computer. The hardware agents are such as humanoid toys and humanoid robots or pet toys and pet robots. Such agents can converse with users in compliance with their embedded programs. In general, monotonous types of speech dialogs are made between the agents and the users. For example, the users answer the agents' questions, the agents answer the users' questions, or the agents carry out the users' commands. Also, since scenarios made by the programs embedded in the agents limit the dialogs' contents, the degree of freedom of speech dialogs is quite low. In addition, the users and the agents do not freely exchange speech dialogs, and thus the speech dialogs are unnatural.

As a conventional technique for overcoming the monotonousness and unnaturalness of speech dialogs, Japanese Patent Publication No. 2002-196789 suggests a speech interactive device which develops speech dialogs with a user based on a recognition standby time counted by a timer and a counter (i.e., a time from when a speech from the speech interactive device utters until the user recognizes the speech uttered from the speech interactive device). However, the speech interactive device starts working only after the recognition standby time has elapsed without the user's speaking. Thus, the speech dialog exchange between the user and the speech interactive device is not rapidly performed. As a result, the speech dialogs are delayed and the user feels bored.

SUMMARY OF THE INVENTION

An aspect of the present invention provides a method of and apparatus for rapidly and precisely managing a dialog turn between a user and an agent by using multi-modal information including speech information, facial expression information, and delay time information.

An aspect of the present invention provides a spoken dialog system using the method and apparatus.

Additional aspects and/or advantages of the invention will be set forth in part in the description which follows and, in part, will be obvious from the description, or may be learned by practice of the invention.

According to an aspect of the present invention, a method of managing a dialog turn between a user and a spoken dialog system includes generating first dialog turn information using dialog information analyzed from a speech uttered by the user; generating second dialog turn information using facial expression information analyzed from a face image of the user; and determining a final dialog turn using the first and second dialog turn information, information on a status of the spoken dialog system, information on whether the user speech is input, and information on a no-answer time of the user.

According to another aspect of the present invention, an apparatus for managing a dialog turn between a user and a spoken dialog system includes a dialog analyzer that generates first dialog turn information using dialog information analyzed from a speech uttered by the user; a facial expression analyzer that generates second dialog turn information using facial expression information analyzed from a face image of the user; a dialog turn determiner that selects one of the first and second dialog turn information using predetermined weight information; and a dialog controller that controls a dialog between the user and the spoken dialog system which determines a final dialog turn using the selected dialog turn information, information on a status of the spoken dialog system, information on whether the user speech is input, and information on a no-answer time of the user.

According to still another aspect of the present invention, a spoken dialog system includes a speech input unit that amplifies a user speech input via a microphone to a predetermined level; a speech recognizer that recognizes the speech signal provided by the speech input unit to output a character string signal; an image input unit that inputs a user face image photographed by a camera; a timer counts a user no-answer time for a predetermined period of time; a dialog manager that generates first dialog turn information using dialog information analyzed from the character string signal, generates second dialog turn information using facial expression information analyzed from the user face image, and determines a final dialog turn using the first and second dialog turn information, information on a status of the spoken dialog system, the character string signal, and the user no-answer time; and an answer generator that generates an answer corresponding to the character string signal with reference to a dialog model database according to a control operation of the dialog manager.

BRIEF DESCRIPTION OF THE DRAWINGS

The above and/or other aspects and advantages of the present invention will become more apparent by describing in detail exemplary embodiments thereof with reference to the accompanying drawings in which.

DETAILED DESCRIPTION OF THE EMBODIMENTS

Figure 1:
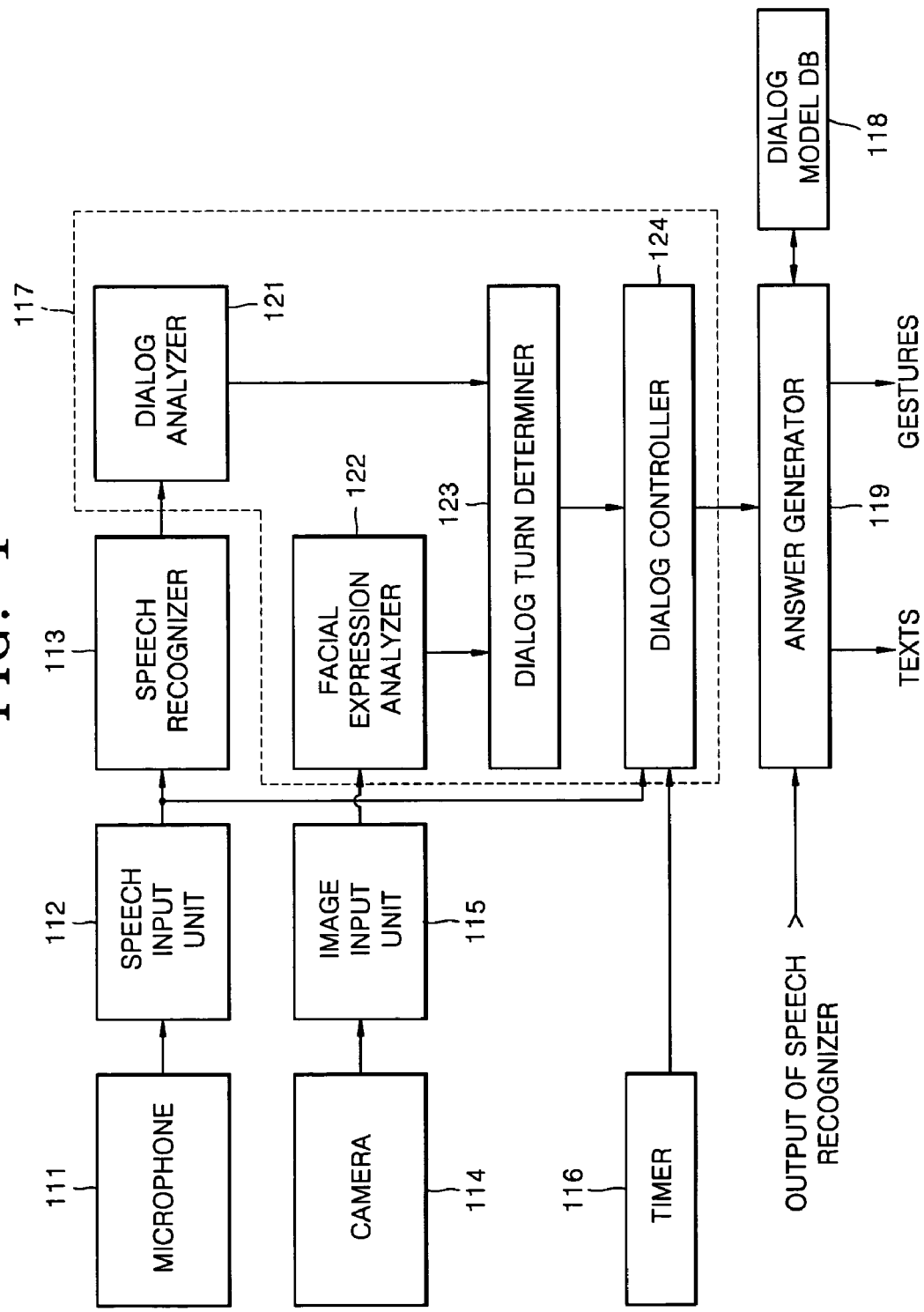
FIG. 1 is a block diagram of a spoken dialog system according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 6:
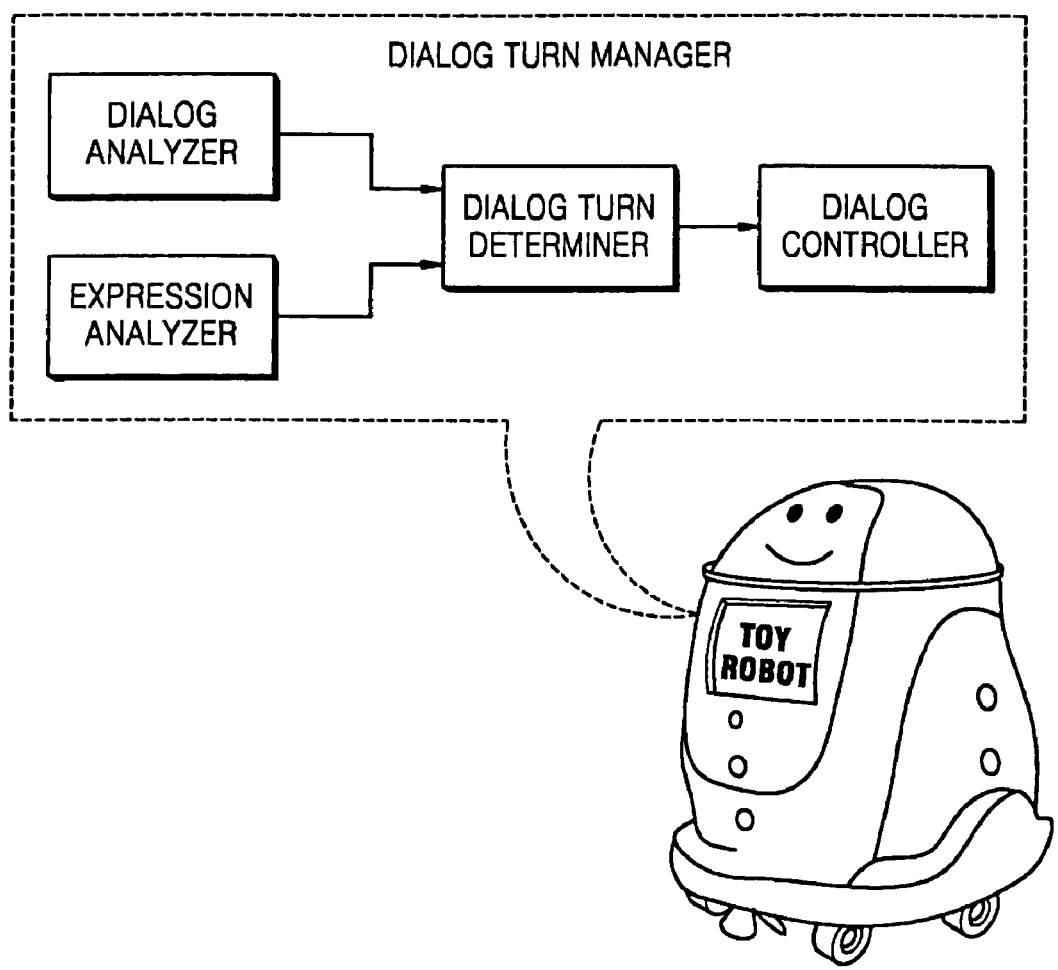
FIG. 6 is a detailed block diagram of a dialog manager in a robot.

FIG. 1 is a block diagram of a spoken dialog system according to an embodiment of the present invention. Referring to FIG. 1, the spoken dialog system includes a microphone 111, a speech input unit 112, a speech recognizer 113, a camera 114, an image input unit 115, a timer 116, a dialog manager 117, a dialog model database (DB) 118, and an answer generator 119. The dialog manager 117 includes a dialog analyzer 121, a facial expression analyzer 122, a dialog turn determiner 123, and a dialog controller 124. The dialog manager 117 may be used by a robot, as illustrated in FIG. 6.

The microphone 111 detects a speech signal from a user and supplies the detected speech signal to the speech input unit 112. The speech input unit 112 amplifies the speech signal to a desired level and supplies the amplified speech signal to the speech recognizer 113. The speech recognizer 113 extracts feature parameters from the speech signal output from the speech input unit 112. Next, the speech recognizer 113 compares vectors of the feature parameters with vectors of feature parameters registered as standard word speech patterns in a recognition dictionary DB using a matching algorithm. According to the matching algorithm, distances between the vectors of the feature parameters and the vectors of the standard word speech patterns are separately calculated and summed. The sum value is defined as a distance X between a pattern of the speech signal supplied from the speech input unit 112 and a standard word speech pattern. When the distance X is minimum, the distance X is normalized to be the highest score (for example, 100) which is defined as a reliability Y of a recognized character string. The recognized character string having the highest reliability Y and the reliability Y are output as recognition results. The speech recognizer 113 supplies the character string signal resulting from the speech recognition to the dialog analyzer 121 of the dialog manager 117.

The camera 114 takes a photograph of a frontal face of the user and supplies an image signal corresponding to the frontal face to the image input unit 115. The image input unit 115 filters noise from the image signal and transmits the filtered image signal to the facial expression analyzer 122 of the dialog manager 117.

The timer 116 sets a no-answer time (for example, 20 seconds). The no-answer time refers to a period from when the answer generator 119 answers in response to the speech recognition results until the user utters a next speech.

The dialog manager 117 receives the speech signal from the speech input unit 112, the character string signal from the speech recognizer 113, the image signal for the user frontal face from the image input unit 115, and the output signal from the timer 116 to determine a dialog turn of the spoken dialog system as one of a turn-take, a turn-wait, and a turn-give.

The dialog model DB 118 represents and stores in advance information on the conditions under which speech act-based dialogs can proceed. The answer generator 119 determines the answer in response to the recognition results of the speech recognizer 113 according to the dialog turn determined by the dialog manager 117 with reference to the dialog mode DB 118. The answer generator 119 generates texts and gestures corresponding to the determined answer.

Figure 2:
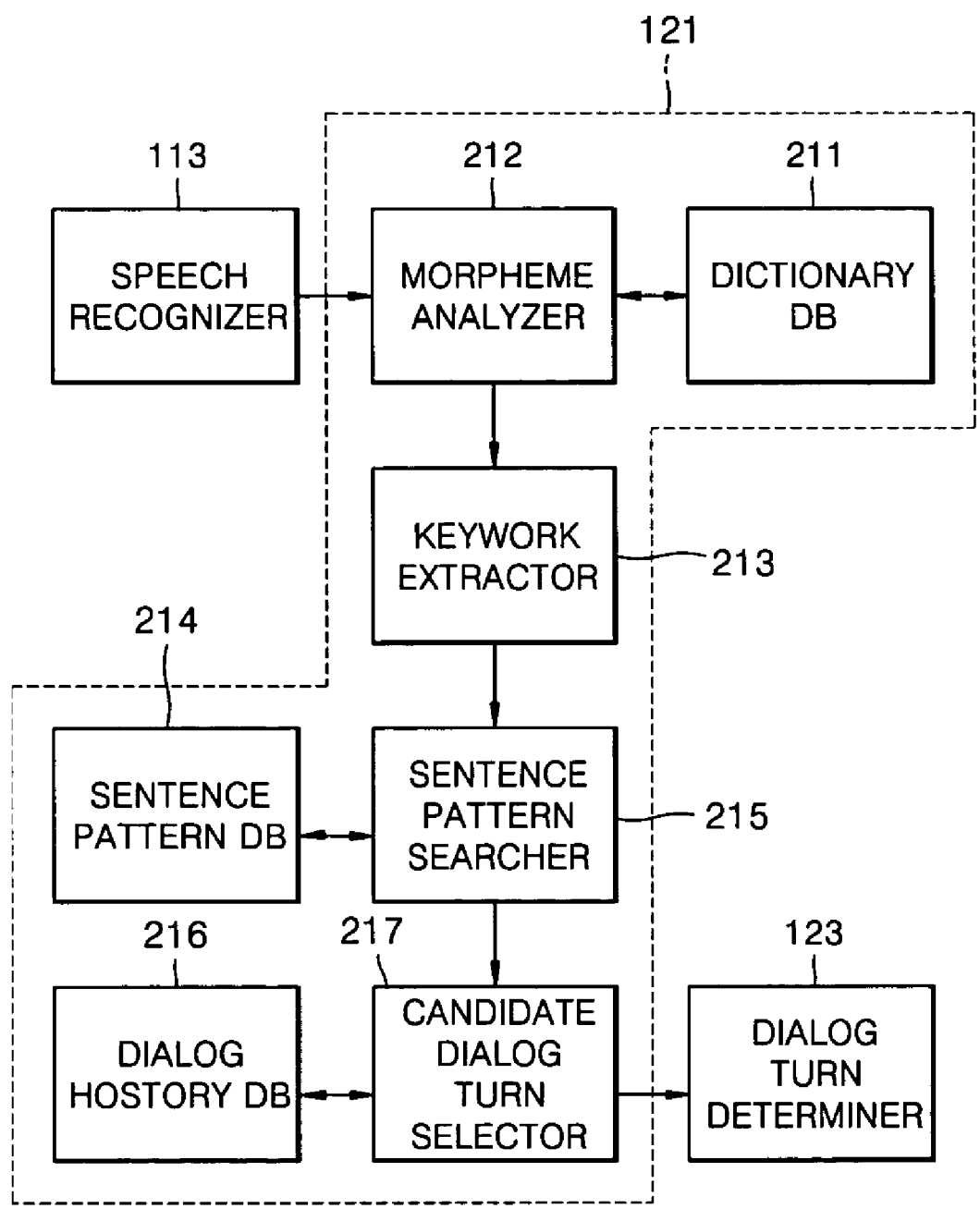
FIG. 2 is a detailed block diagram of a dialog analyzer of FIG. 1.

FIG. 2 is a detailed block diagram of an embodiment of the dialog analyzer 121 of FIG. 1. The dialog analyzer 121 includes a dictionary DB 211, a morpheme analyzer 212, a keyword extractor 213, a sentence pattern DB 214, a sentence pattern searcher 215, a dialog history DB 216, and a candidate dialog turn selector 217. The morpheme analyzer 212 receives the character string signal from the speech recognizer 113. The morpheme analyser 212 analyzes the character string signal into full morphemes and empty morphemes with reference to the dictionary DB 211. However, while described in terms of morphemes, it is understood that the analyser 212 could use other elements of speech.

The keyword extractor 213 extracts keywords (such as sentence pattern information, modal information, discourse marker information, declinable word information, and the like) based on the full morphemes and the empty morphemes. Here, the sentence pattern information refers to sentence patterns used when specific speech acts are realized. For example, the sentence pattern information refers to whether the sentence patterns are an assertive sentence, a yn-question (i.e., a yes-no question) or a wh-question (i.e., a question that contains an interrogative pro-form), an imperative sentence, and so forth. The modal information refers to predicates such as "want", "request", "possible", or the like. The discourse marker information refers to conjunctive adverbs such as "but or however", "so, therefore, or accordingly", "then", or the like. The declinable word information refers to a general verb pvg (such as, go, cross, lie, age, resemble, float, drink), an attributive adjective pad (such as, it is very careful, it is glad, it is neat, it is clear, it is good, it grows), a demonstrative adjective pad (such as it is like that, it is any, it is how, it is like this, it is like that), and so on.

The sentence pattern DB 214 stores statistical or experimental speech act information and dialog turn information resulting from the sentence pattern information, the modal information, and the discourse marker information. This is exemplarily shown in Table 1 below.

TABLE 1

| Speech Act | Sentence Pattern | Declinable Word | Modal | Discourse Marker | Dialog Turn |
|---|---|---|---|---|---|
| Request-act | Imperative | pvg | Request | — | Turn Take |
| Request-act | Yn-quest | pvg | Possible | — | Turn Take |
| Request-act | Assert | pvg | Want | — | Turn take |
| Ask-ref | Imperative | Speak | Request | — | Turn take |
| Inform | Assert | paa | — | — | Turn Wait |
| Inform | Assert | pvg | Want | — | Turn Wait |
| Response | Assert | pvg | Want | — | Turn Wait |
| Response | Assert | frag | — | — | Turn Wait |
| Suggest | Wh-quest | pad | — | Then | Turn Take |
| Suggest | Assert | Recommend | Want | — | Turn Take |
| ... | ... | ... | ... | ... | ... |

The sentence pattern searcher 215 extracts a synthesis of corresponding information (for example, a synthesis of a speech act and a dialog turn) from the sentence pattern DB 214 based on the extracted keywords (i.e., the sentence pattern information, the modal information, and the discourse marker information). As shown in Table 1, several types of speech acts may appear with respect to the same sentence pattern information and the same modal information. For example, when sentence pattern information corresponds to 'assert' and modal information corresponds to 'want', a speech act may correspond to 'request-act', 'inform', or 'response', and a dialog turn according to the speech act may correspond to a turn-take, a turn-wait, or a turn-wait. Accordingly, the sentence pattern searcher 215 may extract at least one or more synthesises of speech acts and dialog turns.

The dialog history DB 216 stores speech act information of previous dialog sentences and has a stack structure so that a reference to the previous dialog sentences can start from the latest one. This is because the contents of previous dialogs become important clues when one sentence pattern indicates another type of speech act depending on situations, thus allowing the dialog analyzer 121 to learn speech acts through experience.

The candidate dialog turn selector 217 selects from the at least one or more synthesises a synthesis of a speech act and a dialog turn corresponding to a currently recognized speech with reference to the dialog history DB 216. In other words, when the sentence pattern searcher 215 extracts one synthesis of a speech act and a dialog turn, the candidate dialog turn selector 217 does not need to refer to the dialog history DB 216. However, when the sentence pattern searcher 215 extracts two or more synthesises of speech acts and dialog turns, the candidate dialog turn selector 217 determines a synthesis of a speech act and a dialog turn corresponding to a speech act of the latest previous dialog sentence with reference to the dialog history DB 216. The candidate dialog turn selector 217 extracts dialog turn information (i.e., a turn-take or turn-wait signal) from the determined synthesis and outputs the turn-take or turn-wait signal to the dialog turn determiner 123.

Figure 3:
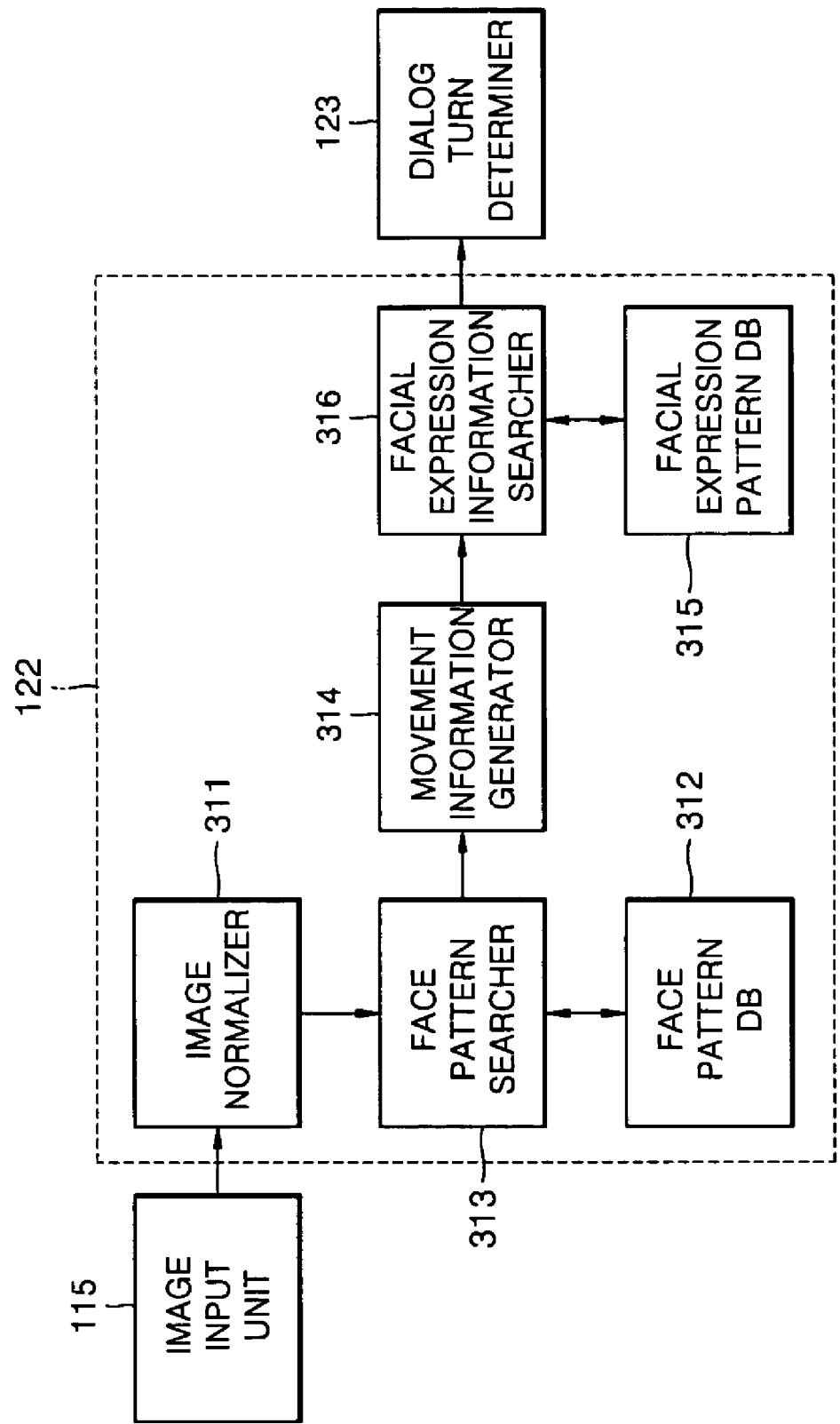
FIG. 3 is a detailed block diagram of a facial expression analyzer of FIG. 1.

FIG. 3 is a detailed block diagram of an embodiment of the facial expression analyzer 122 of FIG. 1. The facial expression analyzer 122 includes an image normalizer 311, a face pattern DB 312, a face pattern searcher 313, a movement information generator 314, a facial expression pattern DB 315, and a facial expression information searcher 316. The image normalizer 311 normalizes the image signal input from the image input unit 115 so as to have a predetermined size, color, and brightness and outputs the normalized image signal to the facial expression pattern searcher 313. The face pattern DB 312 stores data on feature points for recognition of face patterns. Here, the feature point data is used to detect face information from video information. In other words, the face pattern DB 312 stores feature point data on face patterns. According to an aspect of the invention, the feature points are generated from learning of eye, eyebrow, and eyelid patterns of the face patterns.

The face pattern searcher 313 extracts a feature vector from the normalized image signal without losing the face pattern information. The feature points of the face patterns may be extracted using various methods such as Principle Component Analysis (PCA), Independent Component Analysis (ICA), Wavelet Gabor filtering, and the like according to aspects of the invention. The face pattern searcher 313 determines whether the image signal includes a face pattern, using the extracted feature vector and the feature point data. If it is determined that the image signal includes the face pattern, the face pattern searcher 313 searches the face pattern for eye, eyebrow, and eyelid patterns and obtains information on locations of feature points of the face, eye, eyebrow, and eyelid patterns. Here, the face pattern searcher 313 according to aspects of the invention includes a linear classifier and a non-linear classifier (such as a neural network or a support vector machine (SVM)) to recognize the face pattern.

The movement information generator 314 detects temporal and spatial movements from the location information of the feature points of the face, eye, eyebrow, and eyelid patterns to generate movement information. Here, the movement information generator 314 compares the location information of the feature points of the face, eye, eyebrow, and eyelid patterns with information on locations of feature points of eye, eyebrow, and eyelid patterns of a standard face pattern facing the front side with its eyes opened. Thereafter, the movement information generator 314 generates information on movements of the face, eye, eyebrow, and eyelid patterns based on information on their motions for a predetermined period of time.

The facial expression pattern DB 315 statistically or experimentally stores information on a current speaker, and a facial expression pattern and a dialog turn thereof. This is exemplarily shown in Table 2 below.

TABLE 2

| Movement Information | Facial Expression Pattern | Current Speaker | Status | Dialog Turn |
|---|---|---|---|---|
| EYE (LOCATION) | CONTACT EYE-EYE | USER | Speaking (i.e., expecting an answer from a counterpart) | Turn Take |
| EYELID (MOVING) | BLINK EYE | USER | Speaking (i.e., expecting an answer from a counterpart) | Turn Take |
| EYE (MOVING) | LOOK AWAY | SYSTEM | Listening (i.e., being ready to speak) | Turn Give |
| FACE (MOVING) | NOD | SYSTEM | Listening (i.e., being ready to speak) | Turn Give |
| EYEBROW (MOVING) | RAISE EYEBROW | SYSTEM | Listening (i.e., keep listening) | Turn Wait |

For example, when dislocation information of each feature point of the eye pattern is close to "0", it is determined that eyes face the front side (i.e., the agent/the spoken dialog system) without moving. Next, a facial expression pattern to a status of "contact eye-eye" is set. In other words, the facial expression pattern is classified as statuses of "contact eye-eye", "blink eye", "nod", "raise eyebrow", "look away", and the like based on the dislocation information of the feature points of the face, eye, eyebrow, and eyelid patterns. Thereafter, a final dialog turn is determined and stored in the facial expression pattern DB 315 depending on which of the user and the agent is a current speaker, with respect to each of the classified facial expression patterns.

The facial expression information searcher 316 searches the facial expression pattern DB 315 to extract a dialog turn corresponding to a facial expression pattern of a current speaker using the movement information (i.e., the dislocation information and the current speaker information). For example, referring to Table 2, when the user with the facial expression pattern in the status of 'contact eye-eye' is a current speaker, the facial expression information searcher 316 determines that a dialog turn is a turn-take of the agent (i.e., the system). When the current speaker is the system and the facial expression pattern of the user is in the status of 'look away', the facial expression information searcher 316 determines that the dialog turn is a turn-take of the user (i.e., a turn-give of the system). When the current speaker is the system and the facial expression pattern of the user corresponds to the 'raise eyebrow' status, the facial expression information searcher 316 determines that the dialog turn is a turn-wait of the system.

Figure 4:
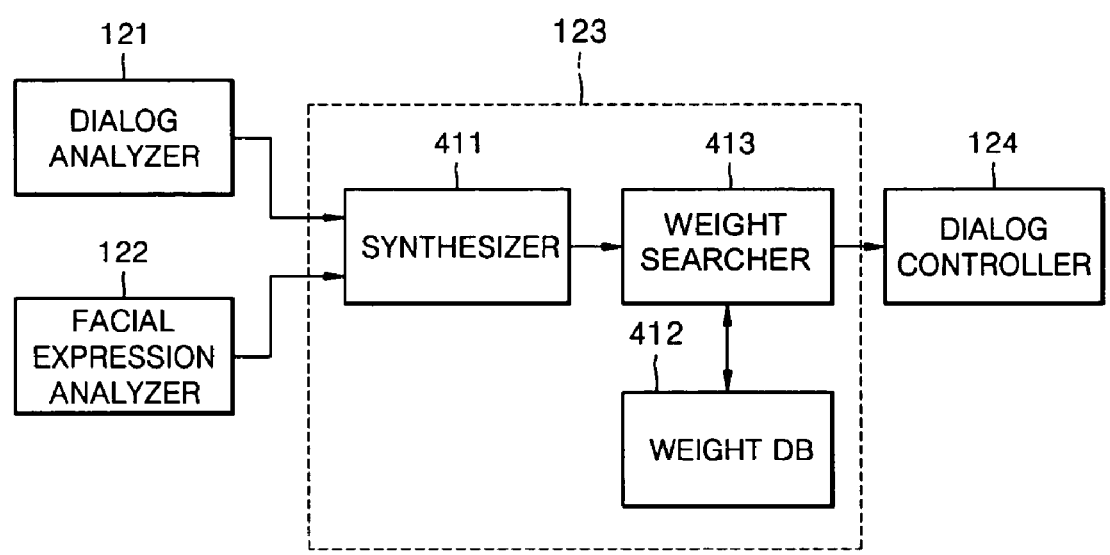
FIG. 4 is a detailed block diagram of a dialog turn determiner of FIG. 1.

FIG. 4 is a detailed block diagram of an embodiment of the dialog turn determiner 123 of FIG. 1. The dialog turn determiner 123 includes a synthesizer 411, a weight DB 412, and a weight searcher 413. The synthesizer 411 synthesizes the dialog turn information from the dialog analyzer 121 and the dialog turn information from the facial expression analyzer 122 and outputs the synthesized dialog turn information to the weight searcher 413. In contrast, when the synthesizer 411 receives the same dialog turn information from the dialog analyzer 121 and the facial expression analyzer 122, the synthesizer 411 immediately provides the received dialog turn information to the dialog controller 124.

As in the former case, when the dialog analyzer 121 and the facial expression analyzer 122 provide different dialog turn information, the weight DB 412 statistically or experimentally stores information on weights put on the different dialog turn information. For example, when a turn-take of the dialog analyzer 121 and a turn-wait of the facial expression analyzer 122 are synthesized, "0.7" may be assigned to the determination result of the dialog analyzer 121 and "0.3" to the determination result of the facial expression analyzer 122.

The weight searcher 413 searches the weight DB 412 for weights corresponding to the synthesis of the dialog turn information of the synthesizer 411 and provides the dialog turn information with a higher weight in the synthesis to the dialog controller 124.

Figure 5:
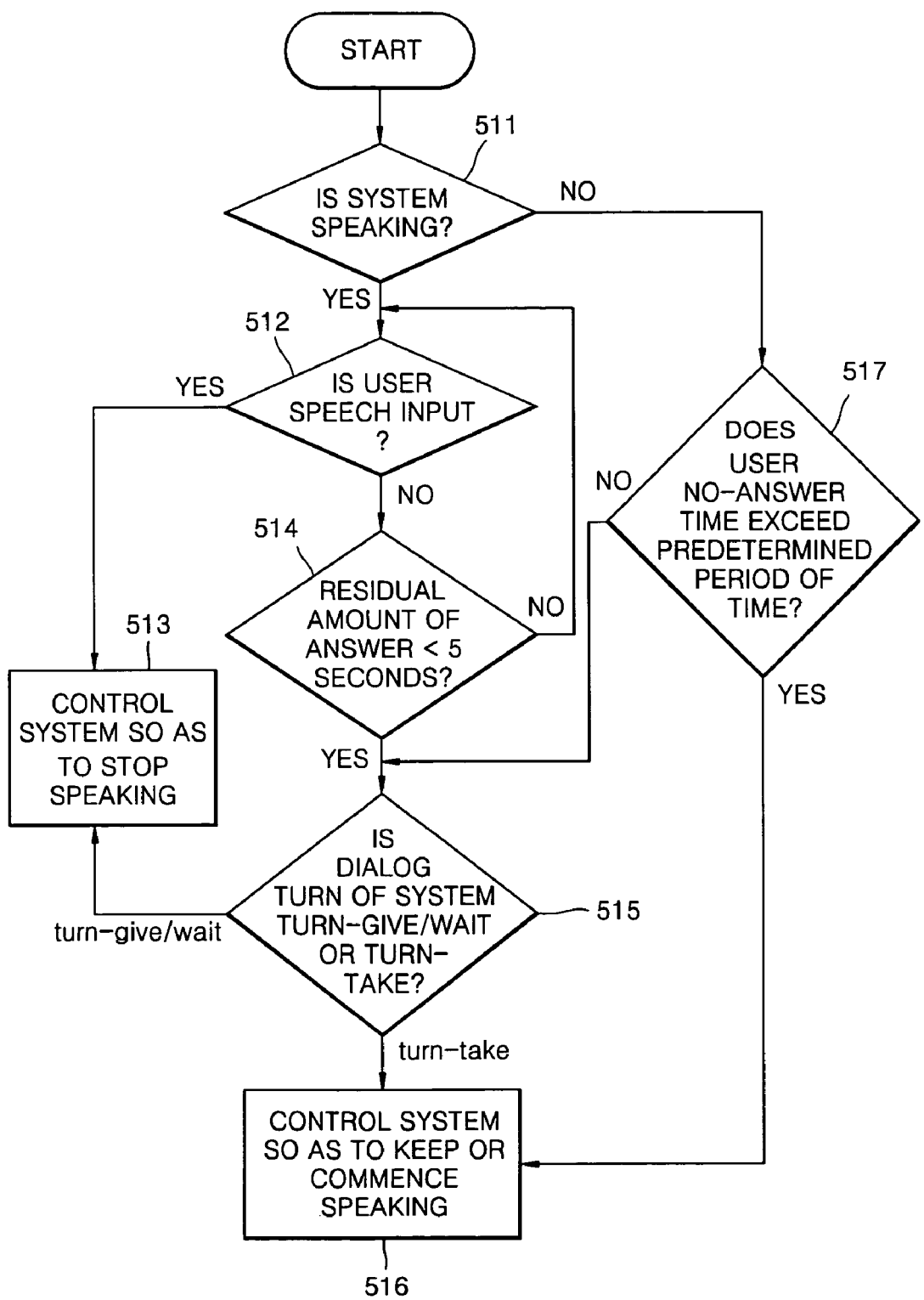
FIG. 5 is a flowchart for explaining an operation of a dialog controller of FIG. 1.

FIG. 5 is a flowchart for explaining an operation of the dialog controller 124 of FIG. 1. Here, the dialog controller 124 determines a final dialog turn from information on the status of the system, the speech signal output from the speech input unit 112, the output signal from the timer 116, and the dialog turn information output from the dialog turn determiner 123 and then controls the operation of the answer generator 119 according to the determined dialog turn.

Referring to FIG. 5, in operation 511, the dialog controller 124 determines whether the system is presently speaking. If in operation 511, it is determined that the system is presently speaking, the dialog controller 124 moves on to operation 512. If in operation 511, it is determined that the system is not presently speaking, the dialog controller 124 moves on to operation 517.

In operation 512, the dialog controller 124 determines whether a speech uttered by a user is input via the speech input unit 112. If in operation 512, it is determined that the user speech has been input via the speech input unit 112, in operation 513, the dialog controller 124 determines that the user and the system simultaneously speak speeches and controls the system so as to stop uttering. If in operation 512, it is determined that the user speech has not been input via the speech input unit 112, in operation 514, the dialog controller 124 determines whether a residual amount of an answer being presently spoken by the system may be finished within a predetermined period of time (for example, whether the system is able to finish speaking the answer within 5 seconds). If in operation 514, it is determined that the residual amount of the answer may not be finished within the predetermined period of time (5 seconds in the described example), the dialog controller 124 returns to operation 512 to continue monitoring the speech signal output from the speech input unit 112.

If in operation 514, it is determined that the residual amount of the answer may be finished within the predetermined period of time (5 seconds in the described example), in operation 515, the dialog controller 124 determines whether a determination result of the dialog turn determiner 123 is a turn-give and/or a turn-wait or a turn-take. If in operation 515, it is determined that the determination result of the dialog turn determiner 123 is the turn-give and/or the turn-wait, the dialog controller 124 returns to operation 513 to control the system so as to stop speaking. If in operation 515, it is determined that the determination result of the dialog turn determiner 123 is the turn-take, the dialog controller 124 moves on to operation 516 to control the system so as to continue speaking.

If in operation 511, it is determined that the system is not presently speaking, in operation 517, the dialog controller 124 monitors signals output from the timer 116 and the speech input unit 112 to determine whether a no-answer time of the user counted starting from when the system speaks the answer exceeds a predetermined period of time (for example, 20 seconds). If in operation 517, it is determined that the no-answer time exceeds the predetermined amount of time (20 seconds in the described example), the dialog controller 124 moves on to operation 516 to control the system so as to commence speaking. If in operation 517, it is determined that the no-answer time does not exceed the predetermined amount of time (20 seconds in the described example), the dialog controller 124 moves on to operation 515.

As described above, according to an aspect of the present invention, in a spoken dialog system, a dialog turn between a user and an agent can be rapidly and precisely managed using multi-modal information including information on user speeches, facial expressions, and delay times. As a result, the user can further naturally and interestedly develop dialogs with the agent. However, it is understood that other elements of body language (such as hand movements, movements of the head and/or shoulders), can be used in addition to or instead of the facial expressions, and that other mechanisms can be used to detect the body language instead of or in addition to using images.

The present invention, or elements thereof, can be realized as a computer-executable program on a computer-readable recording medium and executed in a general-purpose or special purpose computer. Examples of such computer-readable media include magnetic storing media (such as ROMs, floppy discs, hard discs, and so forth), optical reading media (such as CD-ROMs, DVDs, and the like) and firmware.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A method of managing a dialog turn between a user and a spoken dialog system, the method comprising:
   storing weights assigned to varying dialog turn information based on statistical information in a weight database;
   generating first dialog turn information using dialog information analyzed from a speech uttered by the user;
   generating second dialog turn information using facial expression information analyzed from a face image of the user;
   synthesizing the first dialog turn information and the second dialog turn information and outputting the synthesized dialog turn information when the first dialog turn information is different than the second dialog turn information, and outputting one selected from the first dialog turn information and the second dialog turn information when the first dialog turn information is identical to the second dialog turn information;
   searching the weight database for weights corresponding to the synthesized dialog turn information, assigning a positive weight to each of the first and second dialog turn information based on the synthesized dialog turn information and selecting whichever one of the first and second dialog turn information has a greater positive weight; and
   determining a final dialog turn using the selected one dialog turn information, information on a status of the spoken dialog system, information on whether the user speech is input, and information on a no-answer time of the user, for controlling a dialog between the user and the spoken dialog system.

2. The method of claim 1, wherein the generating the first dialog turn information comprises:
recognizing the user speech and analyzing the user speech into morphemes;
extracting sentence pattern information, modal information, and discourse marker information using the morphemes; and
generating the first dialog turn information using the sentence pattern information, the modal information, and the discourse marker information.

3. The method of claim 2, wherein the generating the first dialog turn information further comprises, when at least one dialog turn information corresponding to the sentence pattern information, the modal information, and the discourse marker information exist, generating the first dialog turn information with reference to a recent dialog history.

4. The method of claim 1, wherein the generating the second dialog turn information comprises:
obtaining information on face, eye, eyebrow, and eyelid patterns from the user face image;
comparing the obtained information with standard pattern information to generate information on movements of the user; and
generating the second dialog turn information using the movement information.

5. The method of claim 1, wherein the determining a final dialog turn comprises:
determining from the status information on the spoken dialog system whether the spoken dialog system is presently speaking;
if it is determined that the spoken dialog system is presently speaking, determining the final dialog turn depending on the information on whether the user speech is input and the selected one dialog turn information; and
if it is determined that the spoken dialog system is not presently speaking, determining the final dialog turn depending on the information on the user no-answer time or the selected one dialog turn information.

6. The method of claim 5, wherein the determining the final dialog turn depending on the information on whether the user speech is input and the selected one dialog turn information comprises:
determining whether the user speech is input;
if it is determined that the user speech has been input, controlling the spoken dialog system so as to stop speaking; and
if it is determined that the user speech has not been input, controlling the spoken dialog system so as to one of stop, keep, and commence speaking determined based on the selected one dialog turn information.

7. The method of claim 6, wherein the controlling the spoken dialog system so as to stop, keep, or commence speaking based on the selected one dialog turn information comprises:
if it is determined that the user speech has not been input, a residual amount of an answer being presently spoken by the spoken dialog system is checked, and
if the residual amount of the answer being presently spoken is to be finished within a predetermined period of time and the final dialog turn is determined as the turn-take, the spoken dialog is controlled to continue speaking, otherwise the spoken dialog is controlled to stop speaking.

8. The method of claim 5, wherein the determining the final dialog turn depending on the information on the user no-answer time or the selected one dialog turn information comprises:
determining whether the user no-answer time exceeds a predetermined period of time;
if it is determined that the user no-answer time exceeds the predetermined period of time, controlling the spoken dialog system so as to commence speaking; and
if it is determined that the user no-answer time does not exceed the predetermined period of time, controlling the spoken dialog system to one of stop, keep, and commence speaking determined based on the selected one dialog turn information.

9. A computer-readable storage medium encoded with computer readable code to control a computer to implement the method of claim 1.

10. An apparatus for managing a dialog turn between a user and a spoken dialog system including a computer having computing device-executable instructions, the apparatus comprising:
a dialog analyzer, controlled by the computer, that generates first dialog turn information using dialog information analyzed from a speech uttered by the user;
a facial expression analyzer, controlled by the computer, that generates second dialog turn information using facial expression information analyzed from a face image of the user;
a weight database, controlled by the computer, that stores weights assigned to varying dialog turn information based on statistical information;
a synthesizer, controlled by the computer, that synthesizes the first dialog turn information and the second dialog turn information, the synthesizer outputting the synthesized dialog turn information to a weight searcher when the first dialog turn information is different than the second dialog turn information and outputting one selected from the first dialog turn information and the second dialog turn information to a dialog controller when the first dialog turn information is identical to the second dialog turn information;
the weight searcher searching the weight database for weights corresponding to the synthesized dialog turn information output from the synthesizer, assigning a positive weight to each of the first and second dialog turn information based on the synthesized dialog turn information and selecting whichever one of the first and second dialog turn information has a greater positive weight; and
the dialog controller determining a final dialog turn using the selected one dialog turn information, information on a status of the spoken dialog system, information on whether the user speech is input, and information on a no-answer time of the user, for controlling a dialog between the user and the spoken dialog system.

11. The apparatus of claim 10, wherein the dialog analyzer comprises:
a morpheme analyzer that analyzes the user speech into morphemes;
a keyword extractor that extracts sentence pattern information, modal information, and discourse marker information using the morphemes;
a sentence pattern database that stores information on speech acts and dialog turns resulting from the sentence pattern information, the modal information, and the discourse marker information; and a sentence pattern searcher that searches the sentence pattern database using the sentence pattern information, the modal information, and the discourse marker information to generate the first dialog turn information.

12. The apparatus of claim 11, wherein the dialog analyzer further comprises:
a dialog history database that stores information on speech acts of a recent dialog sentence; and
a candidate dialog turn selector that selects the first dialog turn information with reference to the dialog history database when the sentence pattern searcher searches out at least one dialog turn information from the sentence pattern database.

13. The apparatus of claim 10, wherein the facial expression analyzer comprises:
an image normalizer that normalizes the user face image so as to have a predetermined size and color;
a face pattern database that stores data on feature points for recognition of face, eye, eyebrow, and eyelid patterns;
a face pattern searcher that searches the face pattern database to obtain information on locations of face, eye, eyebrow, and eyelid patterns of the normalized face image;
a movement information generator that compares the obtained position information with information on locations of standard patterns to generate movement information;
a facial expression pattern database that stores information on facial expression patterns corresponding to the determined movement information and dialog turns of current speakers; and
a facial expression pattern searcher that searches the facial expression pattern database using the movement information to generate the second dialog turn information.

14. The apparatus of claim 10, wherein the dialog controller:
determines from the status information on the spoken dialog system whether the spoken dialog system is presently speaking;
if it is determined that the spoken dialog system is presently speaking, determines the final dialog turn based on the information on whether the user speech is input and the selected one dialog turn information; and
if it is determined that the spoken dialog system is not presently speaking, determines the final dialog turn based the user no-answer time and the selected one dialog turn information.

15. A spoken dialog system including a computer having computing device-executable instructions, the system comprising:
a speech input unit that amplifies a user speech input via a microphone to a predetermined level;
a speech recognizer, controlled by the computer, that recognizes the speech signal provided by the speech input unit to output a character string signal;
an image input unit that inputs a user face image;
a timer that counts a user no-answer time for a predetermined period of time;
a weight database, controlled by the computer, that stores weights assigned to varying dialog turn information based on statistical information;
a dialog manager, controlled by the computer, that generates first dialog turn information using dialog information analyzed from the character string signal and generates second dialog turn information using facial expression information analyzed from the user face image;
a synthesizer, controlled by the computer, that synthesizes the first dialog turn information and the second dialog turn information, the synthesizer outputting the synthesized dialog turn information to a weight searcher when the first dialog turn information is different than the second dialog turn information and outputting one selected from the first dialog turn information and the second dialog turn information to a dialog controller when the first dialog turn information is identical to the second dialog turn information;
the weight searcher searching the weight database for weights corresponding to the synthesized dialog turn information output from the synthesizer, assigning a positive weight to each of the first and second dialog turn information based on the synthesized dialog turn information and selecting whichever one of the first and second dialog turn information has a greater positive weight;
the dialog controller determining a final dialog turn using the selected one dialog turn information; and
an answer generator, controlled by the computer, that generates an answer corresponding to the character string signal with reference to a dialog model database according to a control operation of the dialog-controller.

16. A method of managing a dialog turn between a user and a spoken dialog system, the method comprising:
storing weights assigned to varying dialog turn information based on statistical information in a weight database;
generating first dialog turn information using dialog information analyzed from a speech uttered by the user;
generating second dialog turn information using body expression information analyzed from a detected body expression of the user;
synthesizing the first dialog turn information and the second dialog turn information and outputting the synthesized dialog turn information when the first dialog turn information is different than the second dialog turn information, and outputting one selected from the first dialog turn information and the second dialog turn information when the first dialog turn information is identical to the second dialog turn information;
searching the weight database for weights corresponding to the synthesized dialog turn information, assigning a positive weight to each of the first and second dialog turn information based on the synthesized dialog turn information and selecting whichever one of the first and second dialog turn information has a greater positive weight; and
determining a final dialog turn using the selected one dialog turn information for controlling a dialog between the user and the spoken dialog system.

17. The method of claim 16, wherein the determining the final dialog turn further comprising using information on a status of the spoken dialog system, information on whether the user speech is input, and information on a no-answer time of the user to determine the final dialog turn.

18. The method of claim 16, wherein the generating the first dialog turn information comprises:
recognizing the user speech and analyzing the user speech into speech elements;
extracting sentence pattern information, modal information, and discourse marker information using the speech elements; and
generating the first dialog turn information using the sentence pattern information, the modal information, and the discourse marker information.

19. The method of claim 18, wherein the speech elements comprise morphemes.

20. The method of claim 18, wherein the generating the first dialog turn information comprises, when at least one dialog turn information corresponding to the sentence pattern information, the modal information, and the discourse marker information exist, generating the first dialog turn information with reference to a recent dialog history.

21. The method of claim 16, wherein the generating the second dialog turn information comprises:
   obtaining information on a body part pattern from an image of the user;
   comparing the obtained information with standard pattern information to generate information on movements of the user; and
   generating the second dialog turn information using the movement information.

22. The method of claim 21, wherein the obtaining information on the body part comprises obtaining information on a face, eye, eyebrow, and eyelid pattern from the user image.

23. The method of claim 16, wherein the determining the final dialog turn comprises:
   determining from status information on a status of the spoken dialog system whether the spoken dialog system is presently speaking;
   if it is determined that the spoken dialog system is presently speaking, determining the final dialog turn depending on information on whether the user speech is input and the selected one dialog turn information; and
   if it is determined that the spoken dialog system is not presently speaking, determining the final dialog turn depending on information on a user no-answer time and the selected one dialog turn information.

24. The method of claim 23, wherein the determining the final dialog turn depending on the information on whether the user speech is input and the selected one dialog turn information comprises:
   determining whether the user speech is input;
   if it is determined that the user speech has been input, controlling the spoken dialog system so as to stop speaking; and
   if it is determined that the user speech has not been input, controlling the spoken dialog system so as to one of stop, keep, and commence speaking selected based on the selected one dialog turn information.

25. The method of claim 24, wherein the controlling the spoken dialog system so as to one of stop, keep, and commence speaking comprises:
   if it is determined that the user speech has not been input, a residual amount of an answer being presently spoken by the spoken dialog system is checked, and
   if the residual amount of the answer presently spoken is to be finished within a predetermined period of time and the final dialog turn is determined as the turn-take, the spoken dialog is controlled to continue speaking, otherwise the spoken dialog is controlled to stop speaking.

26. The method of claim 23, wherein the determining the final dialog turn depending on the information on the user no-answer time or the selected one dialog turn information comprises:
   determining whether the user no-answer time exceeds a predetermined period of time;
   if it is determined that the user no-answer time exceeds the predetermined period of time, controlling the spoken dialog system so as to commence speaking; and
   if it is determined that the user no-answer time does not exceed the predetermined period of time, controlling the spoken dialog system to one of stop, keep, and commence speaking selected based on the selected one dialog turn information.

27. A computer-readable storage medium encoded with computer readable code to control a computer to implement the method of claim 16.

28. An apparatus for managing a dialog turn between a user and a spoken dialog system including a computer having computing device-executable instructions, the apparatus comprising:
   a weight database, controlled by the computer, that stores weights assigned to varying dialog turn information based on statistical information;
   a dialog analyzer, controlled by the computer, that generates first dialog turn information using dialog information analyzed from a speech uttered by the user;
   a body expression, controlled by the computer, analyzer that generates second dialog turn information using body expression information analyzed from the user;
   a synthesizer, controlled by the computer, that synthesizes the first dialog turn information and the second dialog turn information, the synthesizer outputting the synthesized dialog turn information to a weight searcher when the first dialog turn information is different than the second dialog turn information and outputting one selected from the first dialog turn information and the second dialog turn information to a dialog controller when the first dialog turn information is identical to the second dialog turn information;
   the weight searcher searching the weight database for weights corresponding to the synthesized dialog turn information output from the synthesizer, assigning a positive weight to each of the first and second dialog turn information based on the synthesized dialog turn information and selecting whichever one of the first and second dialog turn information has a greater positive weight; and
   the dialog controller determining a final dialog turn using the selected one dialog turn information for controlling a dialog between the user and the spoken dialog system.

29. The apparatus of claim 28, wherein the dialog controller further determines the final dialog turn using information on a status of the spoken dialog system, information on whether the user speech is input, and information on a no-answer time of the user.

30. The apparatus of claim 28, wherein the dialog analyzer comprises:
   an analyzer that analyzes the user speech into speech elements;
   a keyword extractor that extracts sentence pattern information, modal information, and discourse marker information using the speech elements;
   a sentence pattern database that stores information on speech acts and dialog turns resulting from the sentence pattern information, the modal information, and the discourse marker information; and
   a sentence pattern searcher that searches the sentence pattern database using the sentence pattern information, the modal information, and the discourse marker information to generate the first dialog turn information.

31. The apparatus of claim 30, wherein the speech element analyzed by the analyzer includes morphemes.

32. The apparatus of claim 30, wherein the dialog analyzer further comprises:
   a dialog history database that stores information on speech acts of a recent dialog sentence; and a candidate dialog turn selector that selects the first dialog turn information with reference to the dialog history database when the sentence pattern searcher searches out at least one dialog turn information from the sentence pattern database.

33. The apparatus of claim 28, wherein the body expression analyzer comprises:
   an image normalizer that normalizes an image of the user so as to have a predetermined size and color;
   a body pattern database that stores data on feature points for recognition of the body pattern;
   a body pattern searcher that searches the body pattern database to obtain information on locations of the body pattern of the normalized body image;
   a movement information generator that compares the obtained position information with information on locations of standard patterns to generate movement information;
   a body expression pattern database that stores information on body expression patterns corresponding to the determined movement information and dialog turns of current speakers; and
   a body expression pattern searcher that searches the body expression pattern database using the movement information to generate the second dialog turn information.

34. The apparatus of claim 33, wherein the body pattern comprises face, eye, eyebrow, and eyelid patterns.

35. The apparatus of claim 28, wherein the dialog controller:
   determines from status information on the spoken dialog system whether the spoken dialog system is presently speaking;
   if it is determined that the spoken dialog system is presently speaking, determines the final dialog turn based on the information on whether the user speech is input and the selected one dialog turn information; and
   if it is determined that the spoken dialog system is not presently speaking, determines the final dialog turn based the user no-answer time and the selected one dialog turn information.

36. A robot using the apparatus of claim 28.

* * * * *